(12) United States Patent
Imbabi et al.

(10) Patent No.: US 8,979,997 B2
(45) Date of Patent: Mar. 17, 2015

(54) CONCRETE MIXTURE AND METHOD OF FORMING THE SAME

(75) Inventors: Mohammed Imbabi, Aberdeen (GB); Fredrik Glasser, Aberdeen (GB); Jim Min Wong, Aberdeen (GB)

(73) Assignee: University Court of the University of Aberdeen, Aberdeenshire (GB)

( * ) Notice: Subject to any disclaimer, the term of this patent is extended or adjusted under 35 U.S.C. 154(b) by 770 days.

(21) Appl. No.: 13/001,265

(22) PCT Filed: Jun. 23, 2009

(86) PCT No.: PCT/GB2009/050717
§ 371 (c)(1),
(2), (4) Date: Oct. 31, 2011

(87) PCT Pub. No.: WO2010/007400
PCT Pub. Date: Jan. 21, 2010

(65) Prior Publication Data
US 2012/0032107 A1 Feb. 9, 2012

(30) Foreign Application Priority Data

Jun. 23, 2008 (GB) .................................. 0811522.2

(51) Int. Cl.
*C04B 38/00* (2006.01)
*C04B 20/10* (2006.01)
*C04B 111/00* (2006.01)

(52) U.S. Cl.
CPC ......... *C04B 38/0038* (2013.01); *C04B 20/1077* (2013.01); *C04B 2111/00267* (2013.01)
USPC ........... 106/677; 106/679; 106/705; 106/713; 106/724; 106/737; 106/738

(58) Field of Classification Search
CPC .... C04B 38/00; C04B 38/0003; C04B 24/121
USPC .......... 106/677, 679, 705, 713, 724, 737, 738
See application file for complete search history.

(56) References Cited

U.S. PATENT DOCUMENTS

| | | | |
|---|---|---|---|
| 5,765,334 A | 6/1998 | Vitous | |
| 5,776,243 A * | 7/1998 | Goodson et al. | 106/677 |

(Continued)

FOREIGN PATENT DOCUMENTS

| | | |
|---|---|---|
| CA | 2226590 A1 | 7/1999 |
| JP | 8-183677 A | 7/1996 |

(Continued)

OTHER PUBLICATIONS

KR 2004025446 (Mar. 24, 2004) Choi et al. abstract only.*

(Continued)

*Primary Examiner* — Paul Marcantoni
(74) *Attorney, Agent, or Firm* — Judy M. Mohr; McDermott Will & Emery LLP

(57) ABSTRACT

A concrete mixture for forming a breathable concrete. The mixture comprises aggregate particles and a paste comprising water, cement or cement substitute, and plasticizer. The plasticizer controls the viscosity of the paste such that the paste forms a substantially uniform layer coating the particles, with the coated particles in contact, while allowing spaces to be retained there between. These spaces interconnect forming channels through the concrete, allowing air to permeate there through such that the concrete exhibits good dynamic insulation properties, whist retaining structural strength.

20 Claims, 8 Drawing Sheets

(56) References Cited

U.S. PATENT DOCUMENTS

| | | | |
|---|---|---|---|
| 7,736,431 B2 * | 6/2010 | Bui | 106/713 |
| 7,799,129 B2 * | 9/2010 | Bui | 106/724 |
| 8,110,040 B2 * | 2/2012 | Bui | 106/724 |
| 8,167,996 B2 * | 5/2012 | Bui | 106/713 |

FOREIGN PATENT DOCUMENTS

| | | |
|---|---|---|
| JP | 9-059077 A | 3/1997 |
| JP | 2002-145678 A | 5/2002 |
| KR | 2002-0069759 A | 9/2002 |

OTHER PUBLICATIONS

JP 2000239052 A (Sep. 5, 2000) Aoki abstract only.*

Machine Translation into English for JP 2000239052 A Aoki (Sep. 5, 2000).*

International Search Report from related PCT Patent Application No. PCT/GB2009/050717 mailed on Dec. 3, 2009, application now published as WO 2010/007400 on Jan. 21, 2010.

* cited by examiner

CONCRETE MIXTURE AND METHOD OF FORMING THE SAME

This application is a U.S. National Stage of International Patent Application No. PCT/GB2009/050717, filed Jun. 23, 2009, which claims the benefit of GB Application No. 0811522.2, filed Jun. 23, 2008, all of which are hereby incorporated by reference.

The present invention relates to a concrete mixture and, in particular, a concrete mixture for forming a breathable/air permeable concrete, and method of forming the same.

Concrete is commonly used as a building material, due to its high load bearing capacity. Its main ingredients are cement, such as Portland cement, with the addition of coarse and fine aggregates, air and water. Aggregates in conventional concretes include sand, natural gravel and crushed stone. Artificial aggregates may also be used, especially in lightweight concretes. Once the component materials are mixed together, the mixture sets or hardens due to the chemical process of hydration in which the water reacts with the cement which bonds the aggregates together to form a stone-like material. The proportions of the component materials affect the physical properties of the resultant concrete and, as such, the proportions of mixture components are selected to meet the requirements of a particular application.

In order to reduce the energy consumption required to heat or cool a building, traditionally it was seen as advantageous to make the building as air tight as possible. Accordingly, dense load bearing concrete walls were often used, together with additional insulation, to limit fabric heat losses and to block draughts. However, such construction techniques have led in the past to inadequately ventilated buildings and the accumulation of high levels of volatile organic compounds and other pollutants indoors, resulting in so-called "sick building syndrome".

As appreciation of the importance of ventilation became more widespread, investigations have been made into alternative insulation techniques. Dynamic insulation was identified as a potential way to reduce energy usage whilst improving building ventilation.

In this connection, in contrast to conventional insulation, dynamic insulation works by using the building envelope (exterior walls, roof and floor) materials as an air permeable (porous) heat exchanger. This therefore reduces envelope heat loss as a function of ventilation air flow rate. That is, the effective rate of heat flow, in the presence of a temperature gradient between the inside and outside of a building, is a function of the air flow rate through the dynamically insulating envelope material. As more air is drawn in through the material, the heat flux that is driven by the temperature difference between the inside and outside of a building is re-directed to either heating or cooling the air. In this way, in winter the incoming ventilation air is heated, whereas in summer the incoming ventilation air is cooled. This results in less energy being used to heat and/or cool the building, potentially leading to significant reductions in energy consumption. Additionally, the ventilation air may be filtered as it flows through the dynamically insulating material, thereby reducing pollutant levels inside the building. This filtration may occur mechanically in the case of suspended particulate matter (PM) or chemically in the case of gaseous pollutants.

Accordingly, dynamic insulation has the potential to reduce energy consumption, provide ventilation, and filter incoming air. However, whilst the potential advantages of dynamic insulation have been appreciated, practical implementation of dynamic insulation has proven more difficult. In particular, it has proven difficult to develop commercially viable permeable building materials which could be used as dynamic insulants.

For example, previous attempts have been made to develop permeable concretes for applications such as surface water drainage and for aiding outward diffusion of indoor pollutants (including water vapour) in buildings. This has conventionally been attempted simply by trying to make the concretes suitably porous. It has therefore been suggested that such porous concretes could potentially be used in dynamic insulation. In this way, the high heat capacity of the aggregate particles, for example gravel, crushed rock, or other coarse material aggregate, in the concrete would function as a heat exchanger for heating air passing through pores in the concrete. However, with such conventional concretes, to achieve a sufficiently porous structure to enable the airflow rates which would be required for dynamic insulation, the compressive strength of the concrete would be excessively compromised. This has rendered such porous concretes unsuitable for widespread usage as building materials, and particularly for load bearing or structural applications.

Accordingly, the present invention seeks to overcome the aforementioned problems and provide a breathable concrete material (i.e. an air permeable concrete) that combines both the required permeability properties and adequate compressive strength whilst retaining a high heat capacity. The invention also seeks to produce an eco-friendly breathable concrete with intrinsically good thermal characteristics using a range of synthetic aggregates made from waste materials, such as fly ash and paper ash.

According to an aspect of the present invention, there is provided a concrete mixture for forming a breathable concrete, the mixture comprising:—aggregate particles; a paste comprising water, cement or cement substitute, and plasticiser; the plasticiser controlling the viscosity of the paste such that the paste forms a substantially uniform layer coating the particles, which with the coated particles in contact allows spaces to be retained there between, such spaces being interconnectable to form channels through the mixture.

In this way, a mixture for forming a breathable or air permeable concrete is provided, where the resultant concrete achieves sufficient strength for use as a building material without excessive blocking of channels formed within the concrete structure. This enables the concrete to provide relatively high levels of air permeability and, at the same time, provide good dynamic insulation properties. The paste is preferably self-hardening.

Conveniently, the cement to water ratio in the paste is in the range 0.15 to 0.4 by weight. Preferably, the cement to water ratio in the paste is in the range 0.15 to 0.3 by weight. More preferably, the cement to water ratio is in the range 0.15 to 0.4 by weight.

Conveniently, the average diameter of the aggregate particles is in the range 1 mm to 8 mm. Preferably, the average diameter of the aggregate particles is in the range 1 mm to 4 mm. More preferably, the average diameter of the aggregate particles is in the range 2 mm to 5 mm. Preferably, the average diameter of the aggregate particles is in the range 2 mm to 3 mm. This range has been found to provide a concrete with particularly high strength and heat exchange properties.

Conveniently, wherein the plasticiser controls the setting of the mixture.

In an embodiment, the plasticiser is a superplasticiser.

Conveniently, the degree of filling of the paste to the aggregate particles is in the range 30 to 80%. Preferably, the degree of filling of the paste to the aggregate particles is in the range 50 to 60%. It has been found that this degree of filling level is particularly effective for the formation of a uniform, strong porous structure within the concrete.

Conveniently, the mixture comprises 0.1-1.5% by weight of plasticiser. The plasticiser can act as a surfactant. Preferably, the mixture comprises 0.1-1% by weight of plasticiser. More preferably, the mixture comprises 0.2-0.8% by weight of plasticiser and even more preferably, the mixture comprises 0.2-0.7% by weight of plasticiser. It has been found that these quantities of plasticiser (or superplasticiser) are particularly effective at controlling the fluidity of the cement and water paste to thereby achieve strong bonding between aggregate particles whilst avoiding undue blocking of channels between particles.

In an embodiment, the plasticiser is a melamine formaldehyde series plasticiser. In a preferred embodiment, the plasticiser is melamine-formaldehyde condensate. In an alternative embodiment, the plasticiser is napthalene-formaldehyde condensate or polycarboxylate-ether. It has been found that these plasticisers or superplasticisers are particularly effective at forming the desired concrete structure. It will be understood that other high-range water reducing admixtures could alternatively be used.

Conveniently, the cement is Portland cement (CEM-1), as defined in European norm 196-1.

Conveniently, the aggregate particles have packing densities of 1600 to 2000 kg/m$^3$.

In an alternative embodiment, the aggregate particles have packing densities of 1100 to 1600 kg/m$^3$. In this way, low density aggregates can be used to produce a lightweight breathable/air permeable concrete, offering improved (i.e. lower) thermal conductivity. In an alternative embodiment, the aggregate particles are fly ash aggregate having packing densities of 700 to 800 kg/m$^3$. In a further alternative embodiment, the aggregate particles are paper ash aggregates having packing densities below 700 kg/m$^3$.

In a preferred embodiment, the aggregate particles have a natural packing density ratio of 0.50-0.55. Preferably, the aggregate particles have a natural packing density ratio of 0.53-0.55. This is hence the proportion of volume taken up by the aggregate particles themselves. The natural packing density ratio is defined as the state achieved without compaction or vibration.

According to a further aspect of the present invention, there is provided a method of forming a concrete mixture for forming a breathable concrete, comprising the steps of:—mixing aggregate particles and a paste comprising water, cement or cement substitute, and plasticiser, said plasticiser controlling the water content and viscosity of the paste such that the paste forms a substantially uniform layer coating the particles, which with the coated particles in contact allows spaces to be retained there between, such spaces being interconnectable to form channels through the mixture.

Conveniently, the cement to water ratio in the paste is in the range 0.15 to 0.4 by weight. Preferably, the cement to water ratio in the paste is in the range 0.18 to 0.3 by weight.

Conveniently, the average diameter of the aggregate particles is in the range 1 mm to 8 mm. Preferably, the average diameter of the aggregate particles is in the range 1 mm to 4 mm. More preferably, the average diameter of the aggregate particles is in the range 2 mm to 5 mm. Even more preferably, the average diameter of the aggregate particles is in the range 2 mm to 3 mm.

Conveniently, the plasticiser controls the setting of the mixture.

In an embodiment, the plasticiser is a superplasticiser.

Conveniently, the degree of filling of the paste to the aggregate particles is in the range 30 to 80%. Preferably, the degree of filling of the paste to the aggregate particles is in the range 50 to 60%.

Conveniently, the mixture comprises 0.1-1.5% by weight of plasticiser. Preferably, the mixture comprises 0.1-1% by weight of plasticiser. More preferably, the mixture comprises 0.2-0.8% by weight of plasticiser. Even more preferably, the mixture comprises 0.2-0.7% by weight of plasticiser.

In one embodiment, the plasticiser is a melamine formaldehyde series plasticiser. In a preferred embodiment, the plasticiser is melamine-formaldehyde condensate.

In an alternative embodiment, the plasticiser is napthalene-formaldehyde condensate or polycarboxylate-ether.

Conveniently, the cement is Portland cement (CEM-1), as defined in European norm 196-1.

Conveniently, the aggregate particles have packing densities of 1600 to 2000 kg/m$^3$. In an alternative embodiment, the aggregate particles have packing densities of 1100 to 1600 kg/m$^3$. In an embodiment the aggregate particles are fly ash aggregate having packing densities of 700 to 800 kg/m$^3$. In an alternative embodiment, the aggregate particles are paper ash aggregates having packing densities below 700 kg/m$^3$.

In a preferred embodiment, the aggregate particles have a natural packing density ratio of 0.50-0.55. More preferably, the aggregate particles have a natural packing density ratio of 0.53-0.55.

Conveniently, the method further comprises the step of allowing the mixture to set.

According to a further aspect of the present invention, there is provided a breathable concrete formed by firstly mixing aggregate particles, cement or cement substitute, and water to form a mixture, and secondly allowing the mixture to set, wherein, in the mixture, the cement to water ratio is in the range 0.15 to 0.4 by weight, the average diameter of the aggregate particles is in the range 1 mm to 8 mm, and the degree of filling of the cement and water to the aggregate particles is in the range 30 to 80%, wherein the mixture further comprises a plasticiser or superplasticiser for controlling the fluidity of the cement and water paste during mixing for encouraging the formation of a substantially uniform coating of the paste on the aggregate particles and for controlling coalescence and setting of the paste such that it is held at or near points of contact between the coated aggregate particles to thereby bond said aggregate particles together with open, interconnected channels formed there between.

Conveniently, the static thermal conductivities of the breathable concrete are in the range of 0.1 to 1.4 W/mK. Preferably, the static thermal conductivities are in the range of 0.15 to 1.0 W/mK.

According to a further aspect of the present invention, there is provided use of the above air permeable concrete as a high performance fast charge/fast discharge heat storage and supply building element.

In an embodiment, said aggregates are lightweight natural or synthetic aggregates.

In an embodiment, said aggregates are made from fly ash or paper ash combustion waste products.

According to a further aspect of the present invention, there is provided a building component comprising the above described concrete mixture.

The present invention will now be described by way of example with reference to the accompanying drawings, in which.

Figure 1:
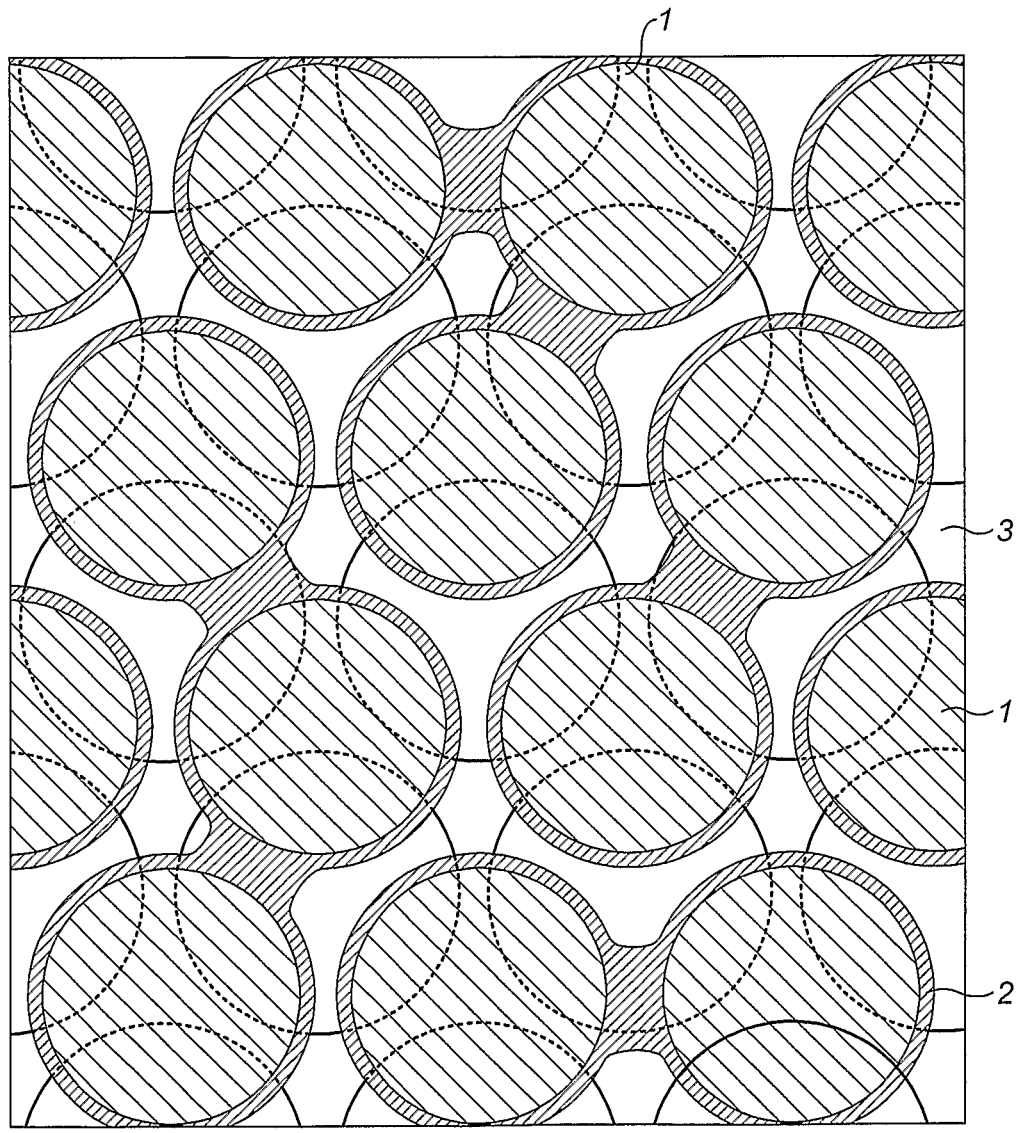
FIG. 1 shows an idealized structure of the breathable concrete according to an embodiment of the present invention.

As an overview, to prepare a breathable concrete, or air permeable concrete, in accordance with an example of the present invention, aggregate in a narrow range of effective sizes is mixed with cement, water and admixtures. The mixing can be performed in a conventional cement/concrete mixer or as part of a continuous process. The mixing process may indeed involve spraying the aggregate with cement. Once mixed, the wet mix can then be poured into moulds, leveled and allowed to harden to form a breathable concrete building component. In the mixing process, the quantities of the components of the concrete mix are selected so as to control the volume and rheology of cement paste, and the size distribution of the aggregate. This is discussed in further detail below.

To provide sufficient air flow through breathable concrete for it to be used as a ventilation source and to permit sufficient heat transfer, the internal structure of the breathable concrete needs to be highly porous, with voids remaining interconnected to allow permeation. Porosity can however reduce compressive strength to unacceptable levels unless the mixture proportions are carefully selected. As mentioned above, the balance between strength and permeability in a breathable concrete according to the present invention is achieved by controlling the way in which the cement paste is set between naturally packed aggregates at the mixing stage.

With regard to the cement itself, Portland cement (CEM-1), as defined in European norm 196-1, is preferably used. Furthermore, the amount of cement available during the mixing process is selected so that it is insufficient to fill all free space between the aggregate particles. This is expressed as the "degree of filling" and specifies mix proportions. The degree of filling is the volumetric ratio of the fresh cement matrix to that of the interconnected voids formed by the intrinsic packing properties of the aggregate, which is in turn affected by their shape and angularity. Preferably, the degree of filling is in the range of about 30-80%, and more preferably 50-60%. It has been found that lower degree of filling levels result in the concrete having inadequate strength, whilst higher levels result in poor permeation properties.

As mentioned above, it is also important to control mix rheology. If the mix is too fluid, the wet cement paste can settle under the influence of gravity, creating a cement rich zone with low permeability and a weakened upper zone. With the present invention, the surface tension of the mix is controlled so that as much as possible of the fresh cement is held at or near points of contact between the aggregate particles. In this way, the cement bonds the aggregate together without blocking channels between aggregate particles and gravity effects are reduced.

To achieve the above desired control over the amount and fluidity of the concrete mix, the cement is mixed at a low water to cement ratio, in the range 0.15 to 0.4 by weight. Furthermore, an admixture comprising a plasticiser or superplasticiser, such as a superplasticiser from melamine formaldehyde series, napthalene-formaldehyde condensate or polycarboxylate-ether, is added.

In this connection, the plasticiser or superplasticiser improves workability at low water/cement ratios and ensures uniform coating of aggregates whist permitting the controlled coalescence and setting of surplus cement paste at the contact points between aggregate particles. This thereby creates the open, interconnected channels required for air to flow. In this respect, at the micro level, the degree of filling is controlled by the amount of concrete and water paste and the plasticiser or superplasticiser. FIG. 1 shows a schematic illustration of the structure of the breathable concrete, where aggregate particles 1 are bonded together by the cement 2 to maintain open channels 3. In this connection, in a preferred embodiment, Melamine-formaldehyde condensate plasticiser is used in quantities ranging between 0.2-0.8% by weight. If the dose of plasticiser or superplasticiser is too high, it can induce segregation, prevent or delay the mixture curing, and weaken the resultant cement. If the dose is too low, control over the fluidity of the concrete mix is not achieved.

With regard to the aggregate particles, these are prepared by sieving to a narrow selected size fraction to obtain aggregate sizes in the range 2 to 6 mm. The aggregate packing densities are selected in the region of 700 to 2000 kg/m$^3$.

As mentioned above, the degree of filling is affected by the shape and angularity of aggregates. In this respect, the packing density (PD) of an aggregate is used to indicate how well the solid particles of the aggregate would fill a mould volume and is expressed as Equation 1.

$$PD = V/M \qquad \text{Equation 1}$$

where:

V is the volume of aggregate; and

M is the geometric volume of the mould.

Figure 2A:
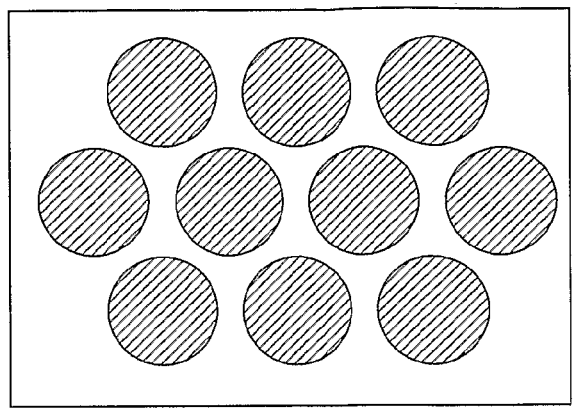
FIGS. 2a to 2c show various shapes of aggregates.
Figure 2B:
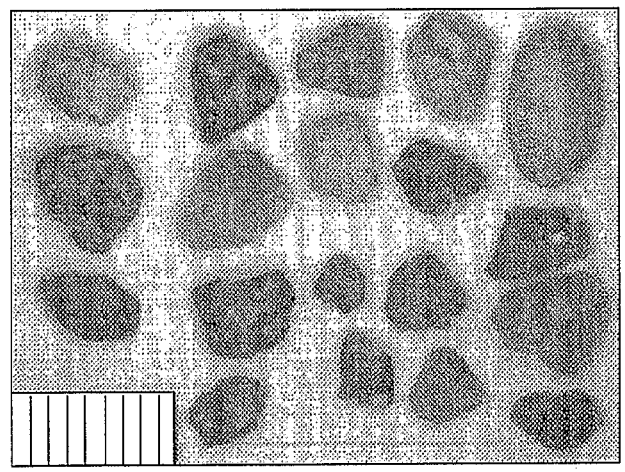
Figure 2C:
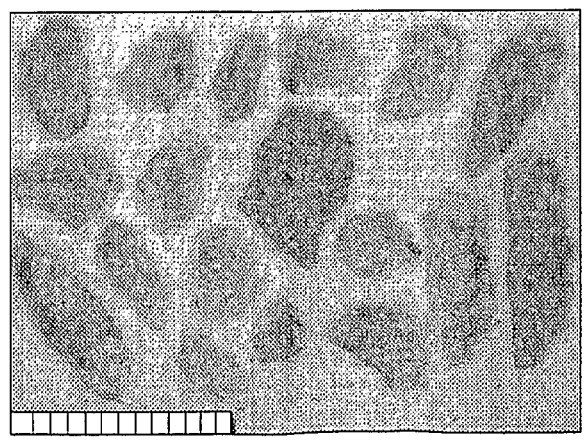

As indicated above, the natural packing density is defined as the state achieved without compaction or vibration. The shape of aggregate and resultant packing density is shown in Table 1 with reference to FIGS. 2a, 2b and 2c which show spherical, slightly rounded irregular and highly angular elongated aggregates respectively.

TABLE 1

| General Description | Natural Packing Porosity | Natural Packing Density |
|---|---|---|
| Sphere, perfectly round | 0.39-0.40 | 0.6-0.61 |
| Irregular, slightly rounded or sub angular | 0.45-0.47 | 0.53-0.55 |
| Flaky, highly angular, elongated | 0.50-0.51 | 0.49-0.50 |

It should be noted that when wet cement is added to dry aggregate, the altered surface tension relationships can alter the packing of the aggregate. It should also be taken into consideration that some aggregates, such as those derived from pelletisation and sintering of fly ash, are porous and either contain entrained water or have the capacity to absorb water from the cement paste.

As will be understood from the above, it is necessary to select and control the shape and angularity of aggregates, and have an understanding of their hygroscopic properties, to achieve the desired level of degree of filling as described above.

For a water to cement ratio of 0.25, Table 2 shows the properties of breathable concrete for different degrees of filling.

TABLE 2

| Degree of Filling | Strength (MPa) | Permeability ($m^2$/Pa · hr) | Concrete porosity |
|---|---|---|---|
| 0.5 | 10.8 | 0.60 | 0.32 |
| 0.6 | 18.2 | 0.32 | 0.28 |
| 0.7 | 25.0 | 0.18 | 0.22 |

It can be seen from Table 2 that for increased degrees of filing, the strength of the concrete increases. However, the permeability of the concrete decreases.

Using size-graded aggregate with a natural packing density ratio of 0.50-0.55, and ordinary Portland cement, Table 3 shows the physical properties of the resultant material with different formulations.

TABLE 3

| Water/Cement weight ratio | Degree of filling | Strength (MPa) | Permeability ($m^2$/Pa · hr) | Concrete Porosity |
|---|---|---|---|---|
| 0.25 | 0.5 | 10.8 | 0.60 | 0.32 |
| 0.25 | 0.6 | 18.2 | 0.32 | 0.28 |
| 0.25 | 0.7 | 25.0 | 0.18 | 0.22 |
| 0.30 | 0.5 | 10.7 | 0.60 | 0.32 |
| 0.30 | 0.6 | 15.3 | 0.32 | 0.28 |
| 0.30 | 0.7 | 21.0 | 0.18 | 0.22 |
| 0.35 | 0.5 | 8.5 | 0.60 | 0.32 |
| 0.35 | 0.6 | 12.7 | 0.32 | 0.28 |
| 0.35 | 0.7 | 15.1 | 0.18 | 0.22 |

As will be appreciated from the above, the present invention provides a breathable concrete which achieves high levels of air permeability, whilst maintaining sufficient strength for building and constructional applications.

In this respect, it has been found that cylindrical samples of the breathable concrete made in accordance with the present invention having 100 mm diameter and 200 mm depth, a degree of filling in the range of 30% to 80%, an aggregate packing density of 1600-2000 kg/$m^3$, and a water to cement ratio of 0.25-0.35 yielded:
   a. crushing strengths in the range 6-30 MPa;
   b. permeabilities to air flow in the range 0.02-0.40 $m^2$/Pa.hr at differential pressures of between 5-20 Pa;
   c. static thermal conductivities in the range 0.15 to 1.01 W/mK.

Effect of Aggregate Type and Size

The mechanical properties of a breathable concrete were investigated by the applicants, focussing on the relationship between crushing strength and aggregate size and type, all other conditions being equal. Testing involved the use of standard 100 mm diameter cast cylinders tested at a constant strain rate of 0.5 mm/min.

Table 4 shows the results for three comparative examples which used crushed granite aggregates ranging in size from 0.6 to 5 mm. In all cases the degree of filling (DF) was 0.6, the w/c ratio was 0.25. Admixtures were not used. Curing was for 7 days.

TABLE 4

| Aggregate | Average Size (mm) | Average Strength (MPa) |
|---|---|---|
| Crushed Granite (0.6-1.18 mm) | 0.9 | 5 |
| Crushed Granite (1.18-2.36 mm) | 1.8 | 7.9 |
| Crushed Granite (2.36-5.0 mm) | 3.7 | 11.6 |

Although the above results show that strength increases with average aggregate size, the rate of increase suggests a falling trend and there is a loss of strength at aggregate sizes approaching 10 mm. That is, between 8 mm and 10 mm there is reduced bridging between aggregate grains, resulting in a less durable, cohesive structure.

The applicants also tested a number of prototype examples of breathable concrete formed using fly ash aggregates. In this respect, rounded Lytag™ aggregates in the 4 to 8 mm size range (average size 5.5 mm) were used to produce standard 100 mm cubes that were similarly tested in compression, yielding the two sets of results in Table 5. In all of the samples using the Lytag aggregate, the degree of filling (DF) was 0.6 and curing before testing was for 5 days.

TABLE 5

| Aggregate | Average Size (mm) | Average Strength (MPa) |
|---|---|---|
| Lytag ™ (Comparative Example #1) (w/c 0.33, no admixture) | 5.5 | 3.6 |
| Lytag ™ (Sample #5/6) (w/c 0.25, 1.4% ADVA ® 151) | 5.5 | 8.1 |

The first row of results relates to a comparative example formulation (Sample #1) which used no admixtures. In this example, a w/c ratio of 0.33 was required to compensate for water absorption by the porous aggregates. Compared to the crushed granite aggregate samples, the Lytag™ samples had around ⅓rd the crushing strength.

The second set of results (samples #5/6) is for a breathable concrete formulation according to a specific example of an embodiment of the present invention. In this case, the formulation was similar to the formulation used in comparative sample #1, except that the formulation further comprised an admixture. That is, the formulation comprised 1.4% by weight of cement of ADVA® 151, a high-range water reducer (superplasticiser) from Grace Construction Products. The presence of this superplasticiser allowed a w/c ratio of 0.25 to be used and resulted in more than double the crushing strength of the material.

Figure 3:
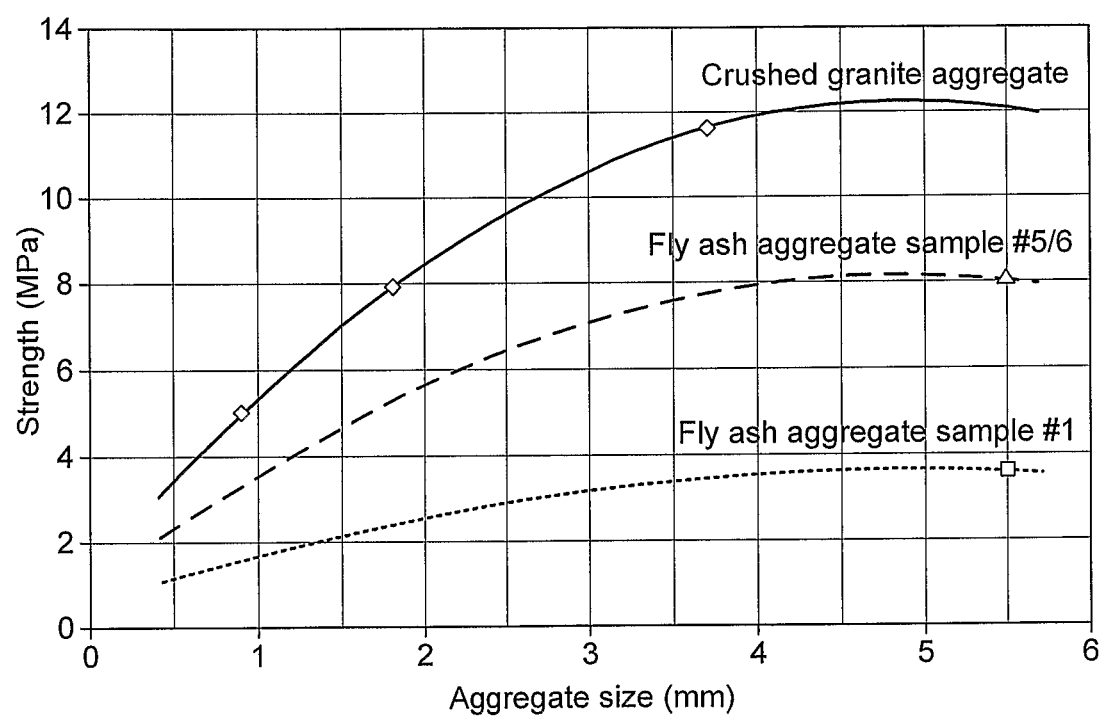
FIG. 3 shows a graph of the effect of aggregate size on compressive strength for a number of example breathable concrete compositions.

The results are charted in FIG. 3 showing how compressive strength varies with aggregate type, size and the presence of plasticiser admixtures. As can be seen by the comparison between comparative sample #1 and samples #5/6, the presence of the superplasticiser acts to improve the workability at reduced w/c ratios of the fly ash breathable concrete mix, resulting in dramatically increased strength.

Figure 4A:
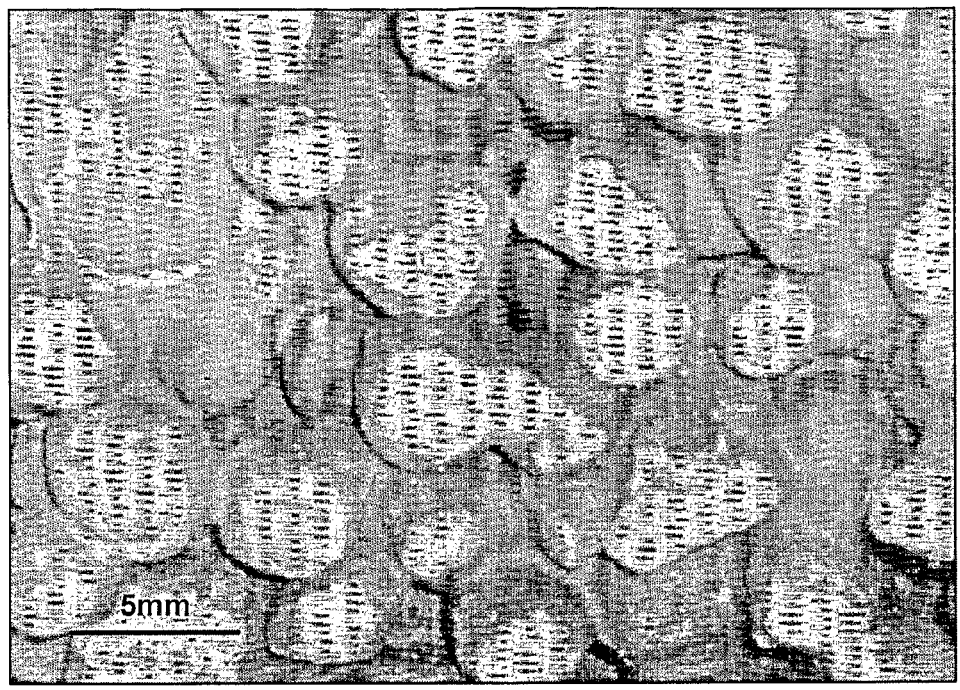
FIG. 4(a) shows the surface structure of a freshly cast fly ash breathable concrete comparative sample.
Figure 4B:
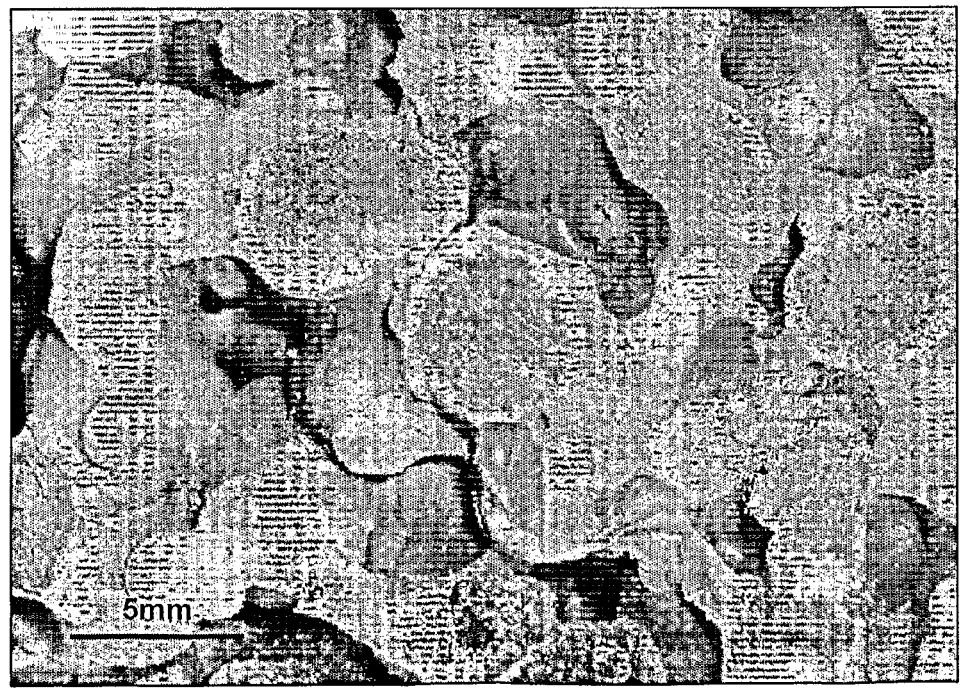
FIG. 4(b) shows the failure surface structure of the fly ash breathable concrete sample shown in FIG. 4(b) after compression testing.

FIG. 4(a) shows the surface of the freshly cast fly ash breathable concrete sample made in accordance with the formulation used in comparative sample #1. As can be seen, the individual Lytag™ grains and the voided channels that permeate the structure can clearly be identified. This provides confirmation that the volume of cement paste used was correctly chosen and appropriate for the formulation. FIG. 4(b) shows the failure surface of fly ash breathable concrete sample #1 after the compression testing discussed above. As can bee seen, there are multiple fracture points through the aggregate grains, as well as in the cement matrix itself. As will be appreciated, in this comparative sample (#1), despite the volume of cement paste used being correctly chosen for the formulation, a relatively low crushing strength was achieved. This contrasts with the high crushing strengths achieved in samples #5/6, which are embodiments of the present invention.

Based on the above, it is therefore demonstrated that the significant increase in crushing strength provided in the breathable concrete of the present invention permits a variety of aggregate types to be used. Indeed, the present invention allows even low density aggregates, such as fly ash, to be used in the air permeable/breathable concrete formulation whist achieving sufficiently high crushing strengths for structural applications.

Thermal Properties of Breathable Concrete

In this connection, it has also been found that the improved static properties in the present invention, such as weight, insulation, and conductivity, are achieved because of the enhanced structure in which air channels between aggregate particles are prevented from clogging, the lower thermal conductivity of light weight synthetic aggregates such as pellatised fly ash, as well as the relatively low degree of filling compared to conventional concretes. That is, due to the higher than normal proportion of air in the concrete of the present invention, the overall thermal conductivity of the concrete material is reduced, because air is a poor thermal conductor compared to the cement matrix. For example, in the above specific example of the present invention described in paragraph [0054], the static thermal conductivity is in the range 0.10 to 1.0 W/mK. This can be compared to a thermal conductivity of above 1.8 W/mK associated with conventional concretes. Similarly, the weight of the material of the present invention is also lower than conventional concretes because less aggregate and cement are present. As such, the present invention also exhibits improved thermal insulating performance. Taken together, breathable concrete is a low carbon material that offers low embodied and operational energy benefits, and footprint. These improvements are achieved without unacceptably compromising the strength of the concrete because of the controlled accumulation of cement at the points of contact between aggregates particles.

As discussed above, breathable concrete of the present invention is a better static insulant when compared to conventional concrete. However, breathable concrete of the present invention really comes into its own as a dynamic insulant, because of its unique permeability to air flow.

As was described above, dynamic insulants work in a similar manner to a contra-flow heat exchanger, where airflow through the insulation media is in an inward direction and heat (or coolth) flow is outwards. The conductance heat (or coolth) recovered in this way takes the form of a reduced ventilation conductance. Depending on the airflow rate through the dynamic insulant, it is possible to achieve a state where, above a certain flow rate, the entire fabric conductance is recovered as ventilation conductance—i.e., no heat (or coolth) is lost via conduction through the material. The 'dynamic' U-value of a wall or roof component in this state is effectively zero. This ushers in the possibility of low energy building envelopes where breathable concrete is an important component.

Figure 5:
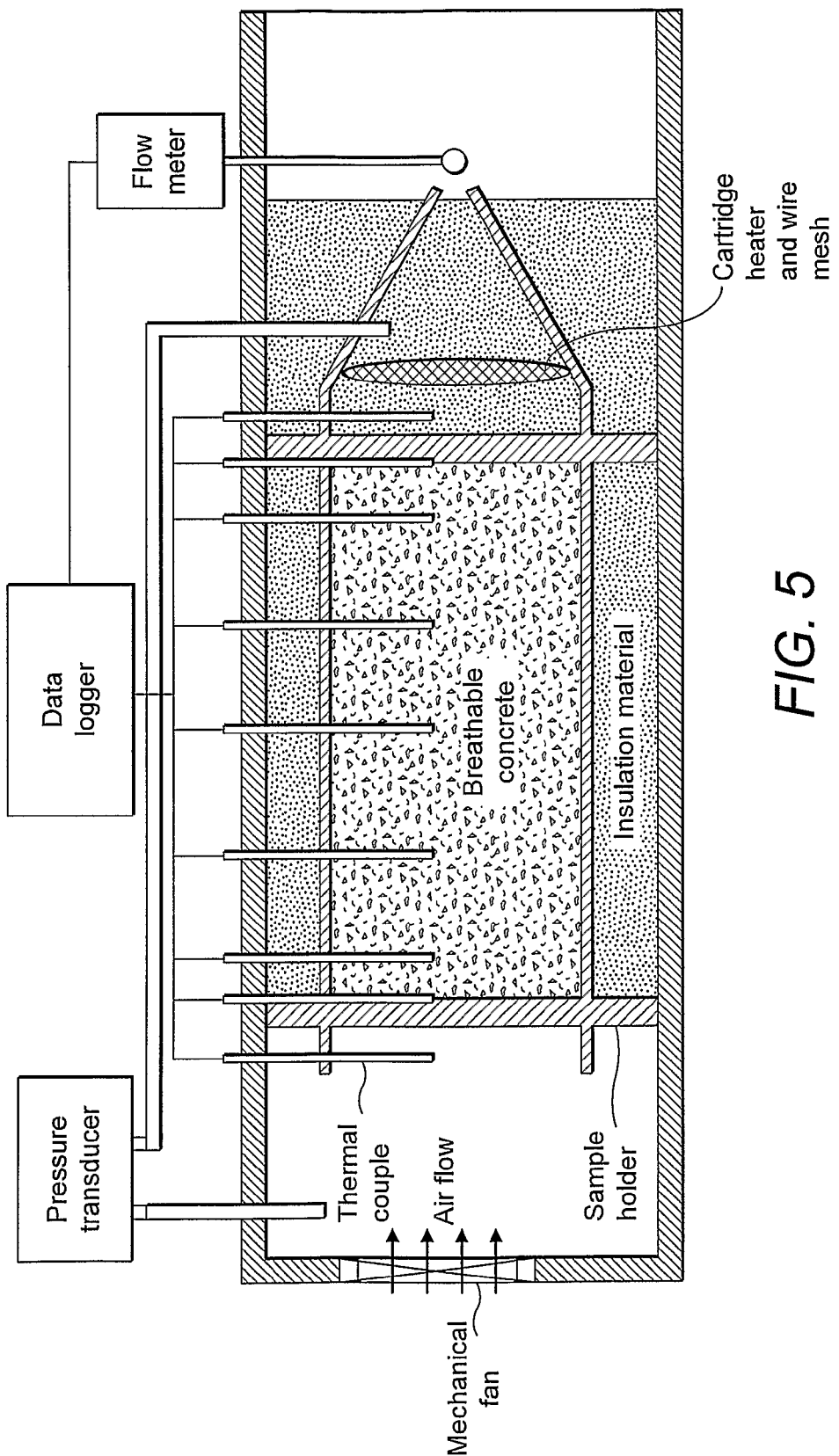
FIG. 5 shows schematically a test rig for measuring changes in the internal temperature profile of a breathable concrete sample as air flows through it against a temperature gradient.

The theory and physics of dynamic heat transfer through air permeable dynamic insulants has been extensively investigated by the applicants. To demonstrate how well the theory applies to practical examples of breathable concrete, the applicants devised a novel experimental test to measure changes in the internal temperature profile of a breathable concrete sample as air flows through it against a temperature gradient. The test rig that was developed and used in this test is shown schematically in FIG. 5.

Explicit relationships exist between the static thermal conductivity of a dynamic insulant, the physical properties of the fluid (air), rate of heat flow through the specimen, fluid flow rate and the temperature profile through depth of the specimen.

Figure 6:
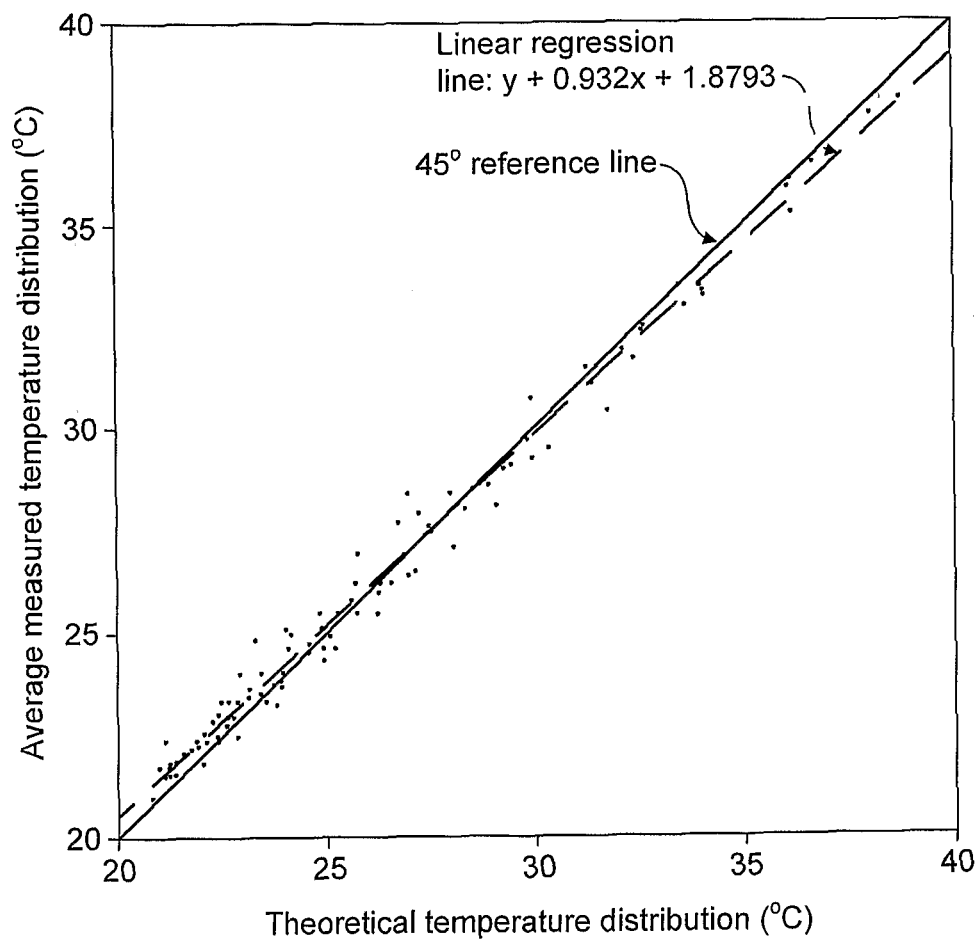
FIG. 6 shows a graph of theoretical temperature distribution against averaged measured temperature distribution measured using the test rig shown in FIG. 5.

If the basic parameters are known, one can theoretically predict the changing internal temperatures in a dynamic insulant. The experiment was used to observe and record the internal temperatures in a breathable concrete sample under a range of thermal boundary conditions and airflow rates. The predicted and measured temperature profiles are plotted against each other in FIG. 6.

In this figure, data point ordinates are the measured and predicted temperatures corresponding to the same set of input parameters. The points are distributed fairly evenly in a narrow band roughly along the 45° line, showing the theoretical model to be reasonably accurate. In an ideal world all of the points would fall along this line. However, linear regression analysis shows that predicted temperatures are, on average, higher than measured temperatures.

The differences between theory and measurement are very slight and could be the result of inaccuracies in how material properties were specified or due to errors in instrumentation. Alternatively, they could be attributed to thermal lag as heat is absorbed and released by the breathable concrete matrix. The theoretical model does not include such effects and would, as a consequence, predict higher temperatures. This 'heat storage' characteristic of breathable concrete has been postulated and could easily account for the observed deviations.

From the above results, it can be seen that the breathable concrete is able to function as a high performance thermal storage component, that can be rapidly charged and discharged.

As a dynamic insulant, the breathable concrete of the present invention can significantly reduce the thermal conductance in both heating and cooling modes when used as the ventilation source. In this connection, it has been found that the improved static insulation leads to an enhanced dynamic insulation effect. This combination of high static insulation properties and enhanced dynamic insulation properties means that the present invention is an extremely effective insulant, to the extent that it provides sufficient insulation such that it may be used as the sole insulation material in certain environments.

In this respect, it should also be noted that the breathable concrete of the present invention offers considerably improved thermal storage functionality compared to conventional concretes. That is, with the breathable concrete of the present invention, warm air is able to flow through the bulk of the material, through the pores provided in its structure. This contrasts with a conventional concrete where air can only flow over the exterior surfaces of the concrete. As such, the breathable concrete of the present invention provides a considerably larger surface area for heat exchange, making it a much more efficient thermal storage medium.

Air Filtration Through Breathable Concrete

In addition, due to its fine porous nature, it has been found that the breathable concrete exhibits high levels of fine and nano-particle filtration of ventilation air (PM filtration). One reason for this is that the residence time of the incoming air moving through the concrete is relatively high, thereby promoting the likelihood of diffusion or interception of pollutants.

Figure 7:
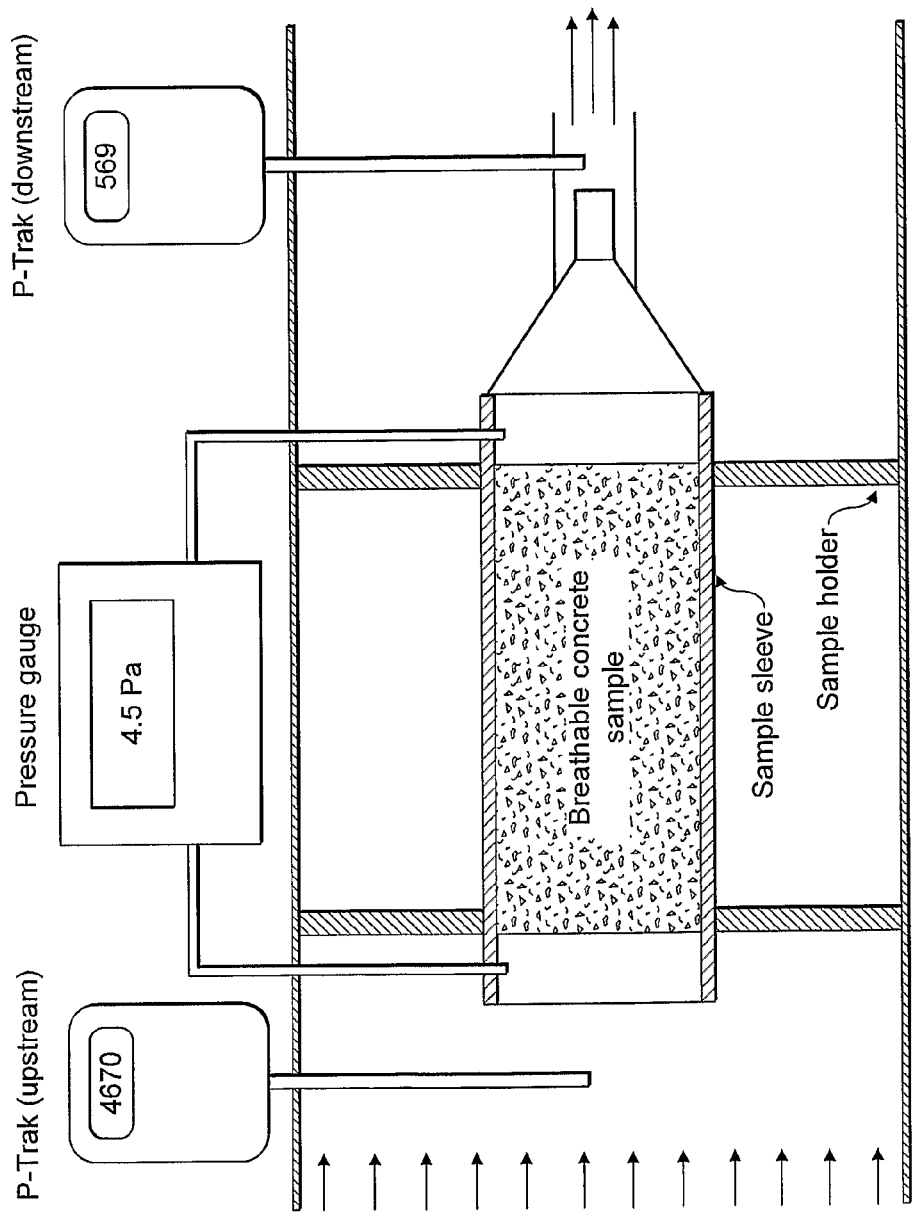
FIG. 7 shows schematically a test rig for measuring PM filtration through a breathable concrete sample.

In order to demonstrate this, a P-Trak particle counter was used to measure the airborne PM counts, in the fine submicron to nanometer range, as air passes through a 100 mm diameter, 200 mm depth cylindrical sample of breathable concrete. The sample was made using crushed granite (1.18-2.36 mm) aggregate, Portland cement, w/c 0.25 and a degree of filling of 0.6, and was from the same batch tested for strength in the 2nd row of Table 4. The test setup is illustrated schematically in FIG. 7.

The procedure used was as follows:
1. Start the airflow and adjust until the pressure drop $\Delta P$ across the sample corresponds to the desired airflow velocity through the sample.
2. Measure and record the upstream load and downstream thru PM counts using the P-Trak air quality monitor under steady-state conditions. In the present instance, this step required approximately 5 minutes to complete.
3. Repeat steps 1 and 2 for a range of airflow velocities, corresponding to different $\Delta P$'s in the range 0-20 Pa.
4. Process and plot the results for particle penetration and filtration efficiency.

Figure 8:
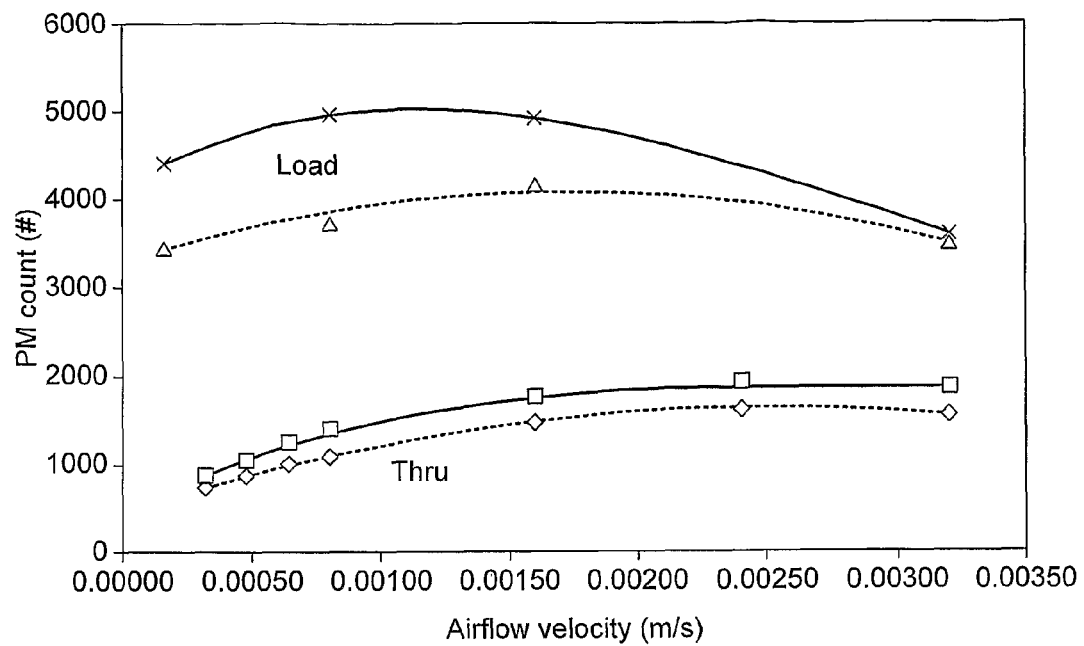
FIG. 8 shows a graph of the effect of airflow velocity on PM penetration.
Figure 9:
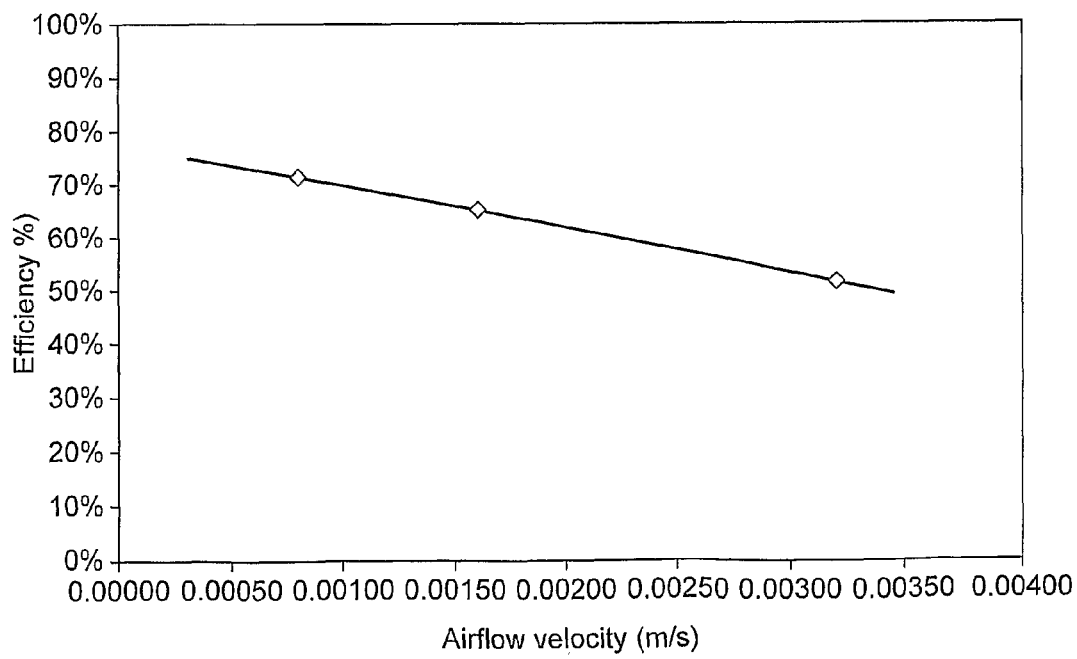
FIG. 9 shows a graph of the effect of airflow velocity on PM filtration efficiency.

Although this test only measures PM numbers (i.e., there is no mass filtration efficiency or a spectral breakdown), the results confirm that filtration does take place and that it is significant. The results are listed in Table 6. plots of PM penetration and filtration efficiency are shown in FIGS. 8 and 9.

TABLE 6

| DP (Pa) | Velocity (m/s) | Downstream PM Count (particles/m$^3$) | | Upstream PM Count (particles/m$^3$) | |
|---|---|---|---|---|---|
| | | Minimum | Maximum | Minimum | Maximum |
| 1 | 0.00016 | 1188 | 1791 | 3506 | 4401 |
| 2 | 0.00032 | 746 | 845 | — | — |
| 3 | 0.00048 | 875 | 1030 | — | — |
| 4 | 0.00064 | 1000 | 1246 | — | — |
| 5 | 0.00080 | 1082 | 1401 | 3719 | 4958 |
| 10 | 0.00160 | 1497 | 1669 | 4159 | 4927 |
| 15 | 0.00240 | 1622 | 1916 | — | — |
| 20 | 0.00320 | 1565 | 1854 | 3472 | 3594 |

The above results reveal similar PM filtration trends that have been observed with fibre-based filtration materials. For example, we know that diffusion is the dominant filtration mode for the very small PM in the sub-micron range. We also know that diffusion works less well at high flow velocities. This explains the loss of efficiency as the airflow velocity through the sample is increased.

From the above, one can draw parallels with fibre-based filters. Thus, altering the size and shape of the tortuous permeation channels in breathable concrete is likely to have a similar effect to altering the fibre size and packing density in a fibre filter. This provides a logical basis for stating that the PM filtration efficiency of breathable concrete can be changed by simply changing the aggregate size, thus allowing the filtration characteristics of the breathable concretes to be controlled and optimised for particular applications.

Resource Efficiency and Sustainability of Breathable Concrete

The breathable concrete is resource-efficient as it uses less cement than denser concrete and, therefore, is a low embodied energy, sustainable material that uses a fraction of the amount of cement used in all other types of structural concrete.

In this connection, as an example, a 0.2 m thick breathable concrete wall made according to the present invention, having a degree of filling of 50%, would (a) have an effective (dynamic) U-value that is 60% less than a conventional concrete equivalent, and (b) would use around ⅔ the mass of cement, compared with conventional concrete.

Furthermore, as discussed above, the present invention allows synthetic aggregates, such as fly ash, to be used instead of gravel or crushed stone. For example, a breathable concrete made in accordance with the present invention may contain ~85% fly-ash. As fly ash is a waste product from coal-fired power stations, such a fly ash breathable concrete would therefore re-absorb around 60% of the $CO_2$ that went into its production. Therefore, a building material that is close to carbon neutral can be provided.

Suitable applications for the breathable concrete of the present invention include, for example, building envelopes and facades, other building elements such as internal partitions, underground structures, tunnels, pavements, other stationary structures.

Although the present invention has been described in the above illustrated embodiments, the present invention is not limited solely to these particular embodiments.

For example, it is envisaged that other enhancements may be made to the concrete. For instance, additives could be provided to enable photo-catalytic and electro-catalytic properties in the filtration process. Another option is the addition of phase change materials which add artificial thermal storage capacity.

Similarly, although in the above illustrative examples, Portland cement has been used, other cements or cement substitutes could alternatively be used.

Furthermore, although in the above illustrative examples, the aggregate particles have packing densities of 700 to 2000 kg/m$^3$, lower density aggregates could alternatively be used for the production of an ultra-lightweight air permeable (breathable) concrete. Such a lightweight breathable concrete can potentially achieve even lower thermal conductivity levels, at least partly because the lower density aggregate particles are poorer thermal conductors compared to denser aggregates. In this connection, aggregate particles with packing densities of 700 to 800 kg/m$^3$ may be used for the production of such a lightweight breathable concrete.

Moreover, although in the above illustrative examples, "naturally packed" aggregates are referred to, it is also envisaged that "non-naturally packed" aggregates could be used. That is, aggregates that have been engineered, compacted, or designer packed to achieve a particular packing arrangement. In this way, the packing of the aggregates could be controlled to deliver specific material properties.

Finally, it will be understood that the breathable concrete of the present invention may be supplied in the form of bricks or as, or part of, preformed building panels. These building components could then be connected together during a building's construction to form a breathable part of the building's envelope.

The invention claimed is:

1. A concrete mixture for forming a breathable concrete, the mixture comprising:
    aggregate particles;
    a paste comprising water, cement or cement substitute, and plasticizer;
    the plasticizer controlling viscosity of the paste such that the paste forms a substantially uniform layer coating the particles, which with the coated particles in contact allows spaces to be retained there between, such spaces being interconnectable to form channels through the mixture;
    wherein the average diameter of the aggregate particles is in the range of 1 mm to 8 mm; and wherein the water to cement ratio in the paste is in the range 0.15 to 0.4 by weight; and wherein a degree of filling of the paste to the aggregate particles is in the range of 30 to 80%; and wherein the degree of filling is the volumetric ratio of the paste to the spaces formed between the aggregate particles.

2. A concrete mixture according to claim 1, wherein the average diameter of the aggregate particles is in the range of 2 mm to 5 mm.

3. A concrete mixture according to claim 1, wherein the plasticizer is a superplasticizer.

4. A concrete mixture according to claim 1, wherein the degree of filling of the paste to the aggregate particles is in the range 50 to 60%.

5. A concrete mixture according to claim 1, wherein the mixture comprises 0.1-1.5% by weight of plasticizer.

6. A concrete mixture according to claim 5, wherein the mixture comprises 0.2-0.8% by weight of plasticizer.

7. A concrete mixture according to claim 1, wherein the plasticizer is a melamine formaldehyde series plasticizer.

8. A concrete mixture according to claim 7, wherein the plasticizer is melamine-formaldehyde condensate.

9. A concrete mixture according to claim 1, wherein the plasticizer is napthalene-formaldehyde condensate or polycarboxylate-ether.

10. A concrete mixture according to claim 1, wherein the plasticizer is any high-range water reducer.

11. A concrete mixture according to claim 1, wherein the cement is Portland cement.

12. A concrete mixture according to claim 1, wherein the aggregate particles have packing densities of 700 to 2000 $kg/m^3$.

13. A concrete mixture according to claim 1, wherein the aggregate particles have packing densities of 700 to 1600 $kg/m^3$.

14. A concrete mixture according to of claim 1, wherein the aggregate particles are fly ash aggregate having packing densities of 700 to 800 $kg/m^3$.

15. A concrete mixture according to claim 1, wherein the aggregate particles are paper ash aggregates having packing densities below 700 $kg/m^3$.

16. A concrete mixture according to claim 1, wherein the aggregate particles have packing densities of less than 1000 $kg/m^3$.

17. A concrete mixture according to claim 1, wherein the aggregate particles have a natural packing density ratio of 0.50-0.55,
    wherein the natural packing density ratio equals V/M
    where
    V is the volume of aggregate used to fill a mold without compaction or vibration of the aggregate, and
    M is the geometric volume of the mold.

18. A method of forming a concrete mixture for forming a breathable concrete, comprising the steps of:
    mixing aggregate particles and a paste comprising water, cement or cement substitute, and plasticizer,
    said plasticizer controlling viscosity of the paste such that the paste forms a substantially uniform layer coating the particles, which with the coated particles in contact allows spaces to be retained there between, such spaces being interconnectable to form channels through the mixture;
    wherein the average diameter of the aggregate particles is in the range 1 mm to 8 mm; and wherein the cement to water ratio is the paste is in the range 0.15 to 0.4 by weight; and wherein a degree of filling of the paste to the aggregate particles is in the range of 30 to 80%; and wherein the degree of filling is the volumetric ratio of the paste to the spaces formed between the aggregate particles.

19. A method according to claim 1, wherein the aggregate particles have a natural packing density ratio of 0.50-0.55,
    wherein the natural packing density ratio equals V/M
    where
    V is the volume of aggregate used to fill a mold without compaction or vibration of the aggregate, and
    M is the geometric volume of the mold.

20. A method according to claim 1, further comprising the step of allowing the mixture to set.

* * * * *